United States Patent
Gandhi et al.

(10) Patent No.: US 10,084,970 B2
(45) Date of Patent: Sep. 25, 2018

(54) SYSTEM AND METHOD FOR AUTOMATICALLY GENERATING SPLIT SCREEN FOR A VIDEO OF A DYNAMIC SCENE

(71) Applicant: International Institute of Information Technology, Hyderabad, Hyderabad (IN)

(72) Inventors: Vineet Gandhi, Hyderabad (IN); Moneish Kumar, Hyderabad (IN); Remi Pierre Ronfard, Grenoble (FR); Michael Lee Gleicher, Madison, WI (US)

(73) Assignee: International Institute of Information Technology, Hyderabad, Hyderabad (IN)

( * ) Notice: Subject to any disclaimer, the term of this patent is extended or adjusted under 35 U.S.C. 154(b) by 0 days.

(21) Appl. No.: 15/832,217

(22) Filed: Dec. 5, 2017

(65) Prior Publication Data
US 2018/0160054 A1    Jun. 7, 2018

(30) Foreign Application Priority Data
Dec. 5, 2016    (IN) .............................. 201641041567

(51) Int. Cl.
*H04N 9/74*    (2006.01)
*H04N 5/262*    (2006.01)
(Continued)

(52) U.S. Cl.
CPC ......... *H04N 5/2624* (2013.01); *G06F 3/0484* (2013.01); *H04N 5/44591* (2013.01); *G06F 2203/04803* (2013.01)

(58) Field of Classification Search
CPC ........ H04N 9/74; H04N 5/2624; H04N 5/445; H04N 5/44591; H04N 5/45; H04N 5/50;
(Continued)

(56) References Cited

U.S. PATENT DOCUMENTS

6,377,309 B1 * 4/2002 Ito .................. H04N 21/234318
348/554
7,876,382 B2 * 1/2011 Imaizumi ........... H04N 5/44591
348/561
(Continued)

*Primary Examiner* — Trang U Tran
(74) *Attorney, Agent, or Firm* — Brokaw Patent Law PC; Christopher J. Brokaw (57) ABSTRACT

A system and method for automatically generating split screen for a video of a dynamic scene is disclosed. The system generates the split screen by (a) obtaining the video of the dynamic scene, (b) detecting one or more objects in the video, (c) selecting one or more shot specifications for the one or more objects, (d) automatically cropping the dynamic scene of the one or more objects based on selected shot specifications, (e) automatically selecting a layout configuration for the split screen based on the cropped dynamic scenes to partition a display screen of a computing unit, (f) optimizing the split screen, (g) automatically generating the split screen by depicting (i) an overview of an original shot of the video in a top half and (ii) the cropped dynamic scenes in the one or more partition views of a bottom half and (h) displaying the split screen to a user.

19 Claims, 8 Drawing Sheets

(51) Int. Cl.
*G06F 3/0484* (2013.01)
*H04N 5/445* (2011.01)

(58) Field of Classification Search
CPC .......... G06F 3/00; G06F 3/048; G06F 3/0484;
G06F 2203/04803
USPC .......................... 715/723; 348/588, 564–565
See application file for complete search history.

(56) References Cited

U.S. PATENT DOCUMENTS

| | | | |
|---|---|---|---|
| 8,185,964 B2 * | 5/2012 | Marchese | G06F 17/3025 |
| | | | 726/29 |
| 8,199,196 B2 * | 6/2012 | Klein | G08B 13/19695 |
| | | | 348/143 |
| 8,261,177 B2 * | 9/2012 | Krishnaswamy | G06F 17/24 |
| | | | 715/202 |
| 8,869,206 B2 * | 10/2014 | Bae | H04N 5/44543 |
| | | | 348/570 |
| 9,344,684 B2 * | 5/2016 | Worrill | H04N 7/181 |
| 2002/0049979 A1 * | 4/2002 | White | G11B 27/034 |
| | | | 725/87 |

* cited by examiner

SYSTEM AND METHOD FOR AUTOMATICALLY GENERATING SPLIT SCREEN FOR A VIDEO OF A DYNAMIC SCENE

CROSS-REFERENCE TO RELATED APPLICATIONS

This application claims priority to Indian patent application no. 201641041567 filed on Dec. 5, 2016, the complete disclosure of which, in its entirely, is herein incorporated by reference.

BACKGROUND

Technical Field

The embodiments herein generally relates to video processing, and more particularly, to a system and method for automatically generating split screen for a video of a dynamic scene captured by a static camera.

Description of the Related Art

Generally, viewers from back row are unable to view clearly the stage shows like dance programs, dramas, etc. This visibility inconvenience limits the viewers from enjoying the stage shows. Also the viewers are unable to clearly view the lip movements, actions and body languages of performers or actors in the stage shows. Considerable efforts have been made in the previous years to overcome the above problem by developing split screen.

Split screen is mainly adapted to creatively portray stories in parallel or to show events or stage performances of favorite artists at different positions and different times simultaneously. Existing approaches for creating split screen are performed by combining video feeds from multiple cameras manually. Existing approaches of creating split screen require multiple cameras to cover the entire scene and is also limited to feeds that are nearly static camera feeds where movements of subjects are minimal. Further each camera should be operated by a photographic professional to obtain the maximum quality video output. Further, when there are sudden movements, accurate capture are difficult or nearly impossible even for a professional camera operator. The cost of creating such split screen using the existing method is high as it requires multiple cameras, trained photographic professionals, and a large amount of manual editing work is required. Further, the existing approaches do not allow creating split screen for dynamic scenes with dynamically varying partition views, since partition views are hard coded.

Accordingly, there remains a need to overcome aforementioned drawbacks of generating split screen and eliminate requirement of multiple cameras, photographic professionals and manual editing work.

SUMMARY

In view of the foregoing, an embodiment herein provides one or more non-transitory computer readable storage mediums storing one or more sequences of instructions, which when executed by one or more processors, causes automatic generation of split screen for a video of a dynamic scene, by (a) obtaining the video of the dynamic scene that is captured by a static camera; (b) detecting one or more objects in the video of the dynamic scene using an object detection technique; (c) selecting one or more shot specifications for the one or more objects in the video based on inputs of a user; (d) automatically cropping at least one of (a) the dynamic scene of the one or more objects or (b) the dynamic scene for the possible combinations of the one or more objects in the video based on the selected shot specifications; (e) automatically selecting a layout configuration for the split screen based on the cropped dynamic scenes of the one or more objects to partition a display screen of a computing unit into (i) a top half and (ii) a bottom half with one or more partition views; (f) automatically optimizing, using a dynamic programming optimization technique, the split screen by (i) seamlessly varying the one or more partition views, (ii) providing smoothness in the cropped dynamic scenes irrespective of the camera motion and (iii) providing jerk free transitions when the one or more objects move from one partition view to another partition view; (g) automatically generating the split screen by depicting (a) an overview of the original shot of the video in the top half and (b) the cropped dynamic scenes in the one or more partition views of the bottom half; and (h) displaying the split screen in real time onto a display of the computing unit.

In one embodiment, the optimization of the one or partition views is performed based on various factors that comprise at least one of (a) the one or more shot specifications, (b) inclusion of desired objects or (c) a steady camera movement.

In another embodiment, the video of the dynamic scene is captured by at least one of (a) a single static camera or (b) multiple static cameras positioned at a vantage point covering the entire dynamic scene.

In yet another embodiment, the layout configuration is automatically selected based on at least one of (i) proximity between the one or more objects in the video and (ii) the one or more objects in the video.

In yet another embodiment, the one or more shot specifications are selected from a group includes (a) a medium close up shot specification; (b) a medium shot specification or (c) a full shot specification.

In yet another embodiment, the optimization of the split screen is performed using a top down layout constraints technique. The top down layout constraints technique (a) provides the jerk free transitions and (b) seamlessly varies the one or more partition views by at least one of (i) concatenation of one or more subset shot specifications equal to a higher order shot specification or (ii) splitting of the higher order shot specification equal to the one or more subset shot specifications.

In yet another embodiment, the selected shot specification provides finer details of (a) emotions, (b) lip movements and (c) body languages of the one or more objects in the video.

In yet another embodiment, further analyzes a subtitle in the video and provides the appropriate subtitle for the object in the associated partition view.

In yet another embodiment, concatenates the one or more subset shot specifications equal to the higher order shot specification when the proximity between the one or more objects in the video becomes less than threshold proximity. It further automatically splits the higher order shot specification equal to the one or more subset shot specifications when the proximity between the one or more objects in the video becomes more than the threshold proximity.

In one aspect, an embodiment herein provides a system for automatically generating split screen for a video of a dynamic scene, comprising a memory and a specialized split screen generation processor. A memory that stores (a) a set of instructions and (b) a database that stores an original shot of the dynamic scene, dimensions of the split screen of the video of the dynamic scene, a threshold proximity and one or more layout configurations. A specialized split screen generation processor that is configured to (a) obtain the video of the dynamic scene that is captured by a static camera; (b) detect one or more objects in the video of the dynamic scene using an object detection technique; (c) select one or more shot specifications for the one or more objects in the video based on inputs of a user; (d) automatically crops at least one of (i) the dynamic scene of the one or more objects or (ii) the dynamic scenes for the possible combinations of the one or more objects in the video based on the selected shot specifications; (e) automatically select a layout configuration for the split screen based on the cropped dynamic scenes of the one or more objects to partition a display screen of a computing unit into (i) a top half and (ii) a bottom half with one or more partition views; (f) automatically optimize, using a dynamic programming optimization technique, the split screen by (i) seamlessly varying the one or more partition views, (ii) providing smoothness in the cropped dynamic scenes irrespective of the camera motion and (iii) providing jerk free transitions when the one or more objects move from one partition view to another partition view; (g) automatically generate the split screen by depicting (i) an overview of the original shot of the video in the top half and (ii) the cropped dynamic scenes in the one or more partition views of the bottom half; and (h) an automatically display the split screen in real time onto a display of the computing unit.

In one embodiment, the optimization of the one or partition views is performed based on various factors that includes at least one of (a) the one or more shot specifications, (b) inclusion of desired objects or (c) a steady camera movement.

In another embodiment, the video of the dynamic scene is captured by at least one of (a) a single static camera or (b) multiple static cameras positioned at a vantage point covering the entire dynamic scene.

In yet another embodiment, the layout configuration is automatically selected based on at least one of (i) proximity between the one or more objects in the video and (ii) the one or more objects in the video.

In yet another embodiment, the one or more shot specifications is selected from a group comprising (a) a medium close up shot specification, (b) a medium shot specification or (c) a full shot specification.

In yet another embodiment, the optimization of the split screen is performed using a top down layout constraints technique. The top down layout constraints technique (a) provides the jerk free transitions and (b) seamlessly varies the one or more partition views by at least one of (i) concatenation of one or more subset shot specifications equal to a higher order shot specification or (ii) splitting of the higher order shot specification equal to the one or more subset shot specifications.

In yet another embodiment, the selected shot specification provides finer details of (a) emotions, (b) lip movements and (c) body languages of the one or more objects in the video.

In yet another embodiment, the system analyzes a subtitle in the video and provides the appropriate subtitle for the object in the associated partition view.

In yet another embodiment, the system automatically concatenates the one or more subset shot specifications equal to the higher order shot specification when the proximity between the one or more objects in the video becomes less than the threshold proximity. The system automatically splits the higher order shot specification equal to the one or more subset shot specifications when the proximity between the one or more objects in the video becomes more than the threshold proximity.

In another aspect, an embodiment herein provides a computer implemented method for automatically generating split screen for a video of a dynamic scene. The method includes steps of (a) obtaining the video of the dynamic scene that is captured by a static camera; (b) automatically detecting one or more objects in the video of the dynamic scene using an object detection technique; (c) selecting one or more shot specifications for the one or more objects in the video based on inputs of a user; (d) automatically cropping at least one of (i) the dynamic scene of the one or more objects or (ii) the dynamic scenes of the possible combinations for the one or more objects in the video based on the selected shot specifications; (e) automatically selecting a layout configuration for the split screen based on the cropped dynamic scenes to partition a display screen of a computing unit into (i) a top half and (ii) a bottom half with one or more partition views; (f) automatically optimizing, using a dynamic programming optimization technique, the split screen by (i) seamlessly varying the one or more partition views, (ii) providing smoothness in the cropped dynamic scenes irrespective of the camera motion and (iii) providing jerk free transitions when the one or more objects move from one partition view to another partition view; (g) automatically generating the split screen by depicting (i) an overview of an original shot of the video in the top half and (ii) the cropped dynamic scenes in the one or more partition views of the bottom half; and (h) displaying the split screen in real time onto a display of the computing unit.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

The embodiments herein will be better understood from the following detailed description with reference to the drawings, in which.

DETAILED DESCRIPTION OF PREFERRED EMBODIMENTS

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

As mentioned, there remains a need for a system to enhance viewing experience of a user or a viewer by depicting split screen with one or more partition views for one or more objects in a video of a dynamic scene captured by a static camera. The embodiments herein achieve this by providing a system that includes a split screen generation system and a computing unit. Referring now to the drawings, and more particularly to FIGS. 1 through 7, where similar reference characters denote corresponding features consistently throughout the figures, preferred embodiments are shown.

Figure 1:
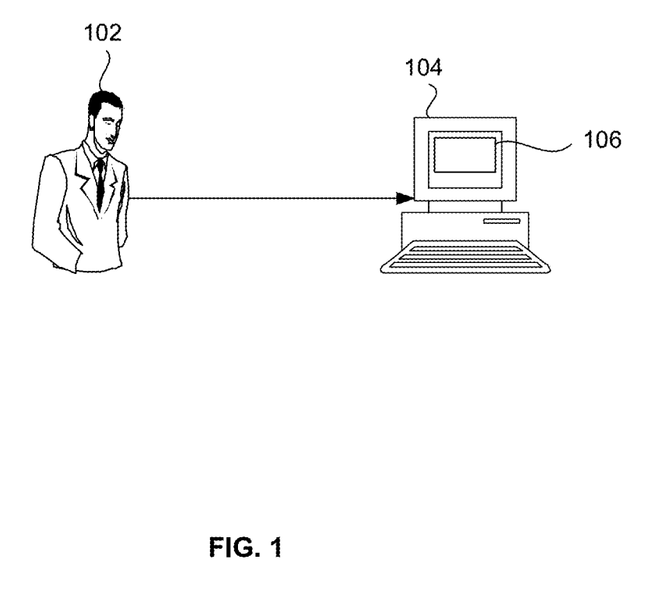
FIG. 1 illustrates a system view of a user interacting with a computing unit for automatically generating split screen for a video of a dynamic scene using a split screen generation system according to an embodiment herein.

FIG. 1 illustrates a system view of a user 102 interacting with a computing unit 104 using a split screen generation system 106 for automatically generating split screen for a video of a dynamic scene, according to an embodiment herein. The split screen generation system 106 obtains the video of the dynamic scene. The video of the dynamic scene may be captured by a static camera. The video may be but it is not limited to at least one of (a) a live video, (b) an online video or (c) an offline video. The live video may be a live drama, a live stage performance, etc. The split screen generation system 106 detects movements of one or more objects in the video of the dynamic scene using an object detection technique. The objects may be but it is not limited to performers, actors, living beings, substances etc. The split screen generation system 106 obtains inputs from the user 102 and selects a shot specification for the one or more objects in the video of the dynamic scene. The user 102 provides the inputs by (a) clicking a desired shot specification in a drop down menu option or (b) entering a text in the drop down menu option. The shot specification may be but it is not limited to at least one of (a) a medium shot specification, (b) a medium close up shot specification or (c) a full shot specification.

The split screen generation system 106 automatically crops the dynamic scene of the video based on the selected shot specification. The cropped dynamic scene may be at least one of (a) the dynamic scene of the one or more objects or (b) the dynamic scenes of the possible combinations of the one or more objects in the video. The split screen generation system 106 automatically selects a layout configuration for the split screen based on the cropped dynamic scenes to partition a display screen of a computing unit into (a) a top half and (b) a bottom half with one or more partition views. The split screen generation system 106 optimizes, using a dynamic programming optimization technique, the split screen by (a) seamlessly varying the one or more partition views, (b) providing smoothness in the cropped dynamic scenes irrespective of the camera motion and (c) providing jerk free transitions when the one or more objects move from one partition view to another partition view. The dynamic programming optimization technique may detect contours or borders in the split screen. The dynamic programming optimization technique may provide smooth transitions when the one or more objects move from one partition view to another partition view. The split screen generation system 106 simulates pan tilt zoom movements of the one or more objects by moving the cropped dynamic scenes. The simulation may be based on at least one of (a) shot size penalty, (b) inclusion constraints or (c) movement regularization.

The shot size penalty penalizes any deviation from the selected shot size specification. The movement regularization is performed by desired camera behavior by at least one of (a) camera static factor, (b) constant velocity partitions or (c) constant acceleration partitions in the split screen. The split screen generation system 106 automatically generates the split screen by depicting (a) an overview of the original shot of the video in the top half and (b) the cropped dynamic scenes in the one or more partition views of the bottom half. The bottom half of the display screen is dynamically partitioned into one or more partition views with varying aspect ratio based on the proximity between the one or more objects in the cropped dynamic scenes. The one or more partition views in the split screen are configured to depict the dynamic scene of the one or more objects or the combination of the one or more objects in the selected shot specification. In an embodiment, the one or more partition views are used to depict finer details like emotions, lip movements, and/or body language of the one or more objects in the video. The spit screen generation system 106 displays the split screen in real time onto a display of the computing unit 104. The computing unit 104 may be but it is not limited to a laptop, a TV, a smart phone, a tablet, and/or a personal communication device. The user 102 may be a normal viewer, a long eye sight challenged person, a long sight challenged person, a short sight challenged person and/or a hearing challenged person.

The split screen generation system 106 may crop the dynamic scene based on the shot specification using center coordinates (x, y), size (s) and the aspect ratio (Ar). The aspect ratio (Ar) is a width to height ratio of the cropped dynamic scene of the one or more objects in the video. The split screen generation system 106 determines the aspect ratio based on the number of objects and the selected shot specification. The split screen generation system 106 virtually crops the dynamic scene for the one or more objects from head to waist, when the medium shot specification is selected. The split screen generation system 106 virtually crops the dynamic scene for the one or more objects from head to mid chest, when the medium close up shot specification is selected. The split screen generation system 106 virtually crops the dynamic scene for the one or more objects from head to toe, when the full shot specification is selected.

The split screen generation system 106 utilizes a top down layout constraints technique to optimize the split screen. The top down layout constraints technique is used to (a) provide the jerk free transitions and (b) seamlessly vary the one or more partition views. In an embodiment, the one or more partition views at point of transitions (t) are seamlessly varied by at least one of (i) concatenation of one or more subset shot specifications to a higher order shot specification or (ii) splitting of the higher order shot specification to the one or more subset shot specifications. The top down layout constraints technique is configured to partition the higher order shot specification exactly equal to the one or more subset shots specification when the proximity between the one or more objects in the video becomes more than threshold proximity. The top down layout constraints technique is further configured to merge or concatenate the one or more subset shot specification to the higher order shot specification when the proximity between the one or more objects in the video becomes less than the threshold proximity. In an embodiment, the threshold proximity can be varied or preset. The top down layout constraints technique is illustrated using $\cup_{i=1:p} f_t^{s_i} = f_t^h$ and $\cap_{i=1:p} f_t^{s_i} = \emptyset$ Where $f_t^{s_i}$ refers to subset shot specification at the point of transitions (t), $f_t^h$ refers to higher order shot specification (i.e. shot specification with maximum number of objects), and $\emptyset$ is the null set. The above equation illustrates the higher order shot specification is partitioned into a set of p subset shot specification $f_t^{s_i}$ $\{f_t^{s_1} \ldots f_t^{s_p}\}$. In an embodiment, the split screen generation system 106 is configured to display only the bottom half that shows only the one or more partition views with varying aspect ratio of the one or more objects in the video.

Figure 2:
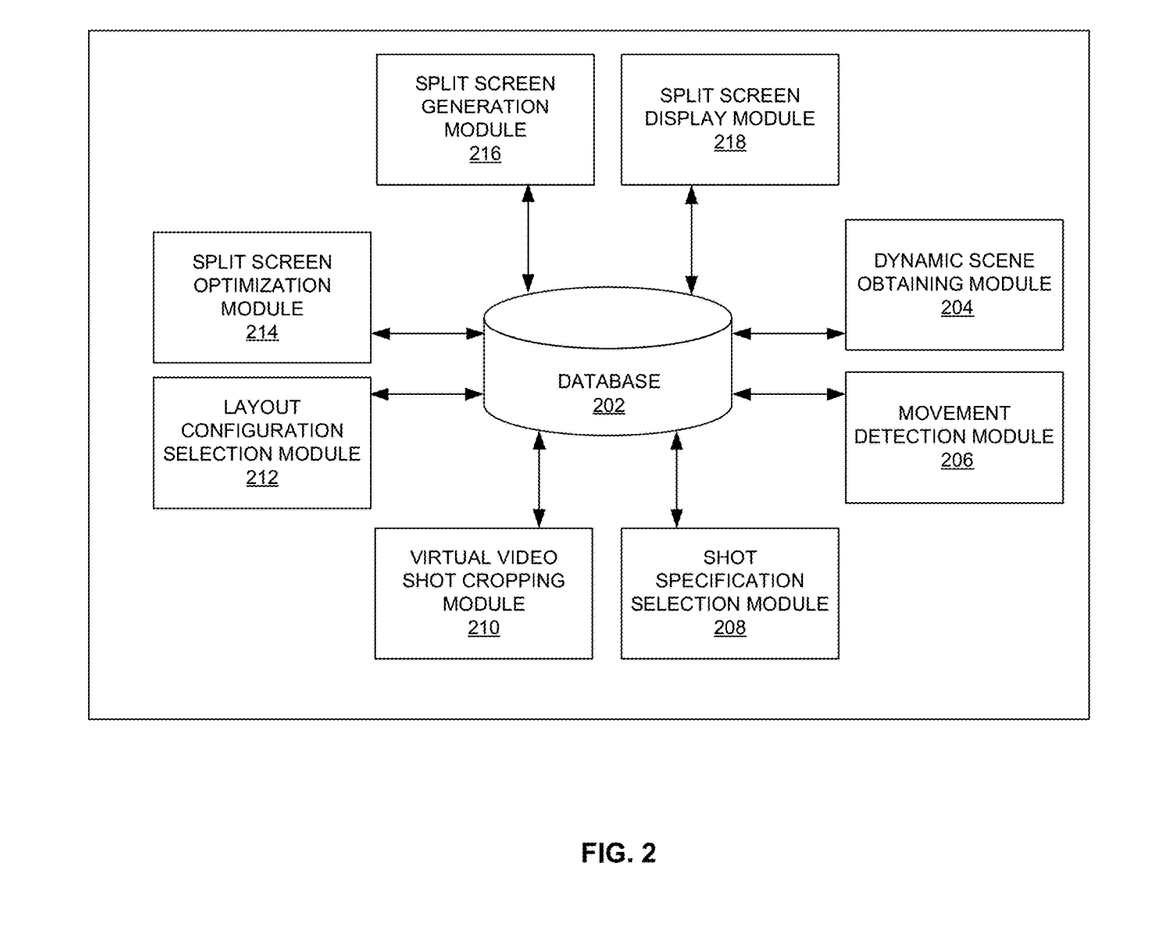
FIG. 2 illustrates an exploded view of the split screen generation system of FIG. 1, according to an embodiment herein.

FIG. 2 illustrates an exploded view of the split screen generation system 106 of FIG. 1 according to an embodiment herein. The split screen generation system 106 includes a database 202, a dynamic scene obtaining module 204, a movement detection module 206, a shot specification selection module 208, a virtual video shot cropping module 210, a layout configuration selection module 212, a split screen optimization module 214, a split screen generation module 216 and a split screen display module 218. The database 202 stores the master shot (i.e. the overview of the original shot) and the split screen of the previous videos. The dynamic scene obtaining module 204 obtains the video of the dynamic scene captured by the static camera. The movement detection module 206 detects the movements of the one or more objects in the video of the dynamic scene that are adapted to select the shot specification. In an embodiment, the movement detection module 206 detects the movements of the one or more objects based on the object detection technique. The shot specification selection module 208 obtains the inputs from the user 102 to select the shot specification for the one or more objects. In an embodiment, the user 102 selects the shot specification by clicking desired shot specification in the drop down menu or entering text in the drop down menu text box. The virtual video shot cropping module 210 automatically crops at least one of (a) the dynamic scenes of the one or more objects or (b) the dynamic scenes for the possible combinations of the one or more objects in the video based on the selected shot specifications.

The layout configuration selection module 212 automatically selects the layout configuration for the split screen based on the cropped dynamic scenes of the one or more objects to partition the display screen of the computing unit 104 into (a) the top half and (b) the bottom half with the one or more partition views. The split screen optimization module 214 optimizes, using the dynamic programming optimization technique, the split screen by (a) seamlessly varying the one or more partition views, (b) providing smoothness in the cropped dynamic scenes irrespective of the camera motion and (c) providing jerk free transitions when the one or more objects move from the one partition view to the another partition view. The split screen generation module 216 generates the split screen by depicting (a) the overview of the original shot of the video in the top half and (b) the cropped dynamic scenes in the one or more partition views of the bottom half. The split screen display module 214 displays the split screen to the user 102 onto the display of the computing unit 104.

Figure 3A:
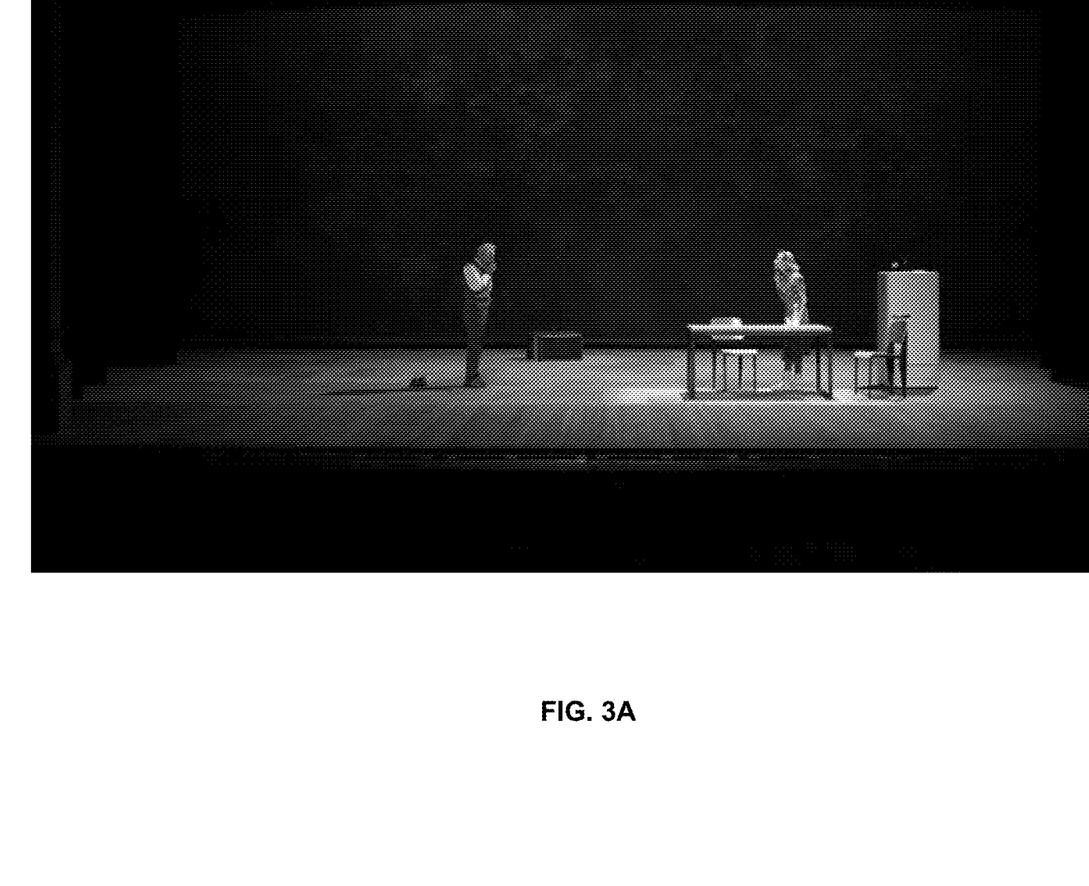
FIG. 3A is an exemplary view of the video of a dynamic scene to be processed by the split screen generation system of FIG. 1, according to an embodiment herein.

FIG. 3A is an exemplary view of a video of a dynamic scene to be processed using the split screen generation system 106 of FIG. 1 according to an embodiment herein. The video shows the static wide angle view of two performers in an entire stage where the emotions of the two performers are not clearly captured. The split screen generation system 106 obtains the video as an input to generate split screen to enhance the viewing experience of the user 102 by depicting one or more objects (i.e. performers) in the one or more partition views with the selected shot specification. In an embodiment, the video may include any number of actors or performers.

Figure 3B:
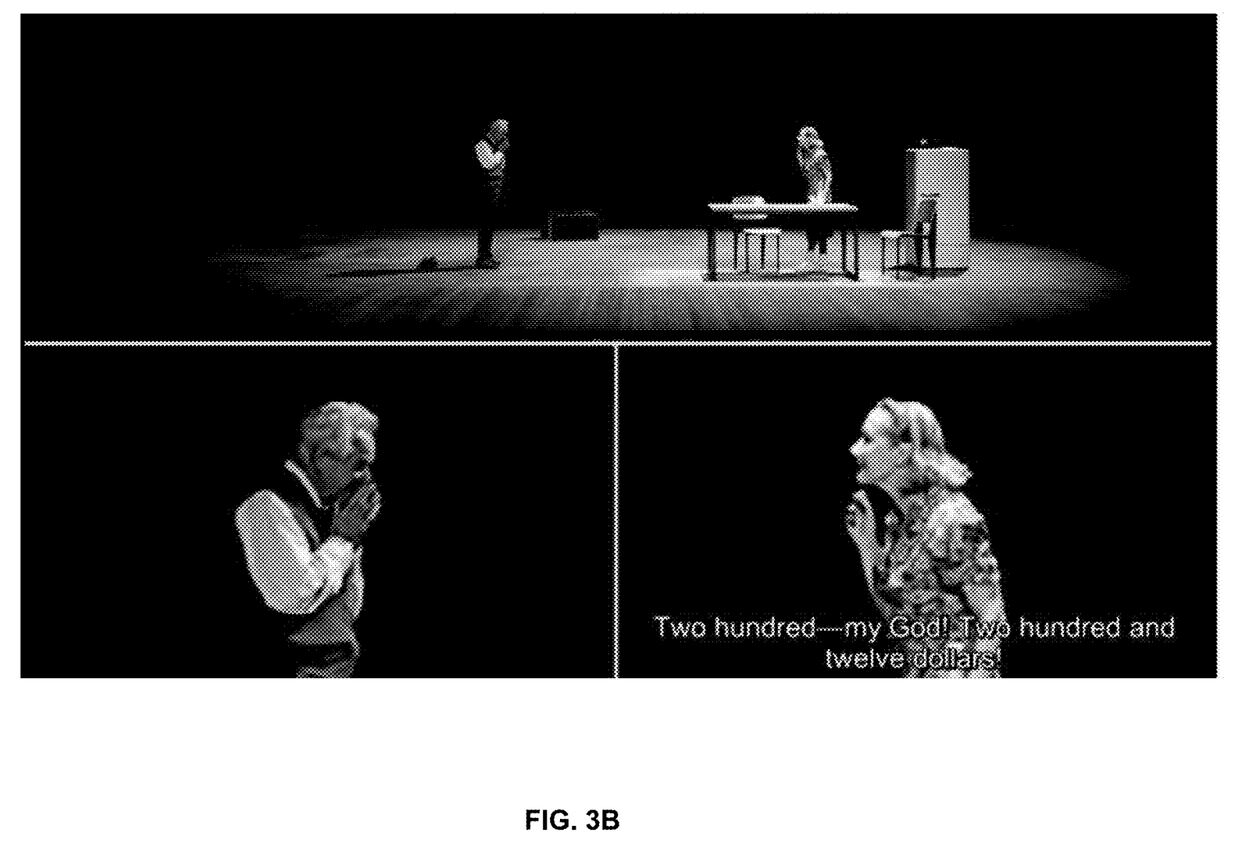
FIG. 3B is an exemplary view of the split screen for the video of FIG. 3A generated by the split screen generation system, according to an embodiment herein.

FIG. 3B is an exemplary view of the split screen generated using the split screen generation system 106 for the video of FIG. 3A according to an embodiment herein. The top half of the split screen shows the overview of master shot (i.e. context part of the video of FIG. 3A) of the video and the bottom half depicts the one or more partition views. Each partition view depicts the one or more objects in the medium shot specification (i.e. focus part of the video in the selected shot specification) to enhance the viewing experience of the user 102. The one or more partition views further depict the finer details like emotions, lip movements, and body languages of the one or more objects. The split screen generation system 106 may provide a subtitle in associated partition views of the one or more objects that enhance the viewing experience of the hearing challenged user 102 or viewer.

Figure 4:
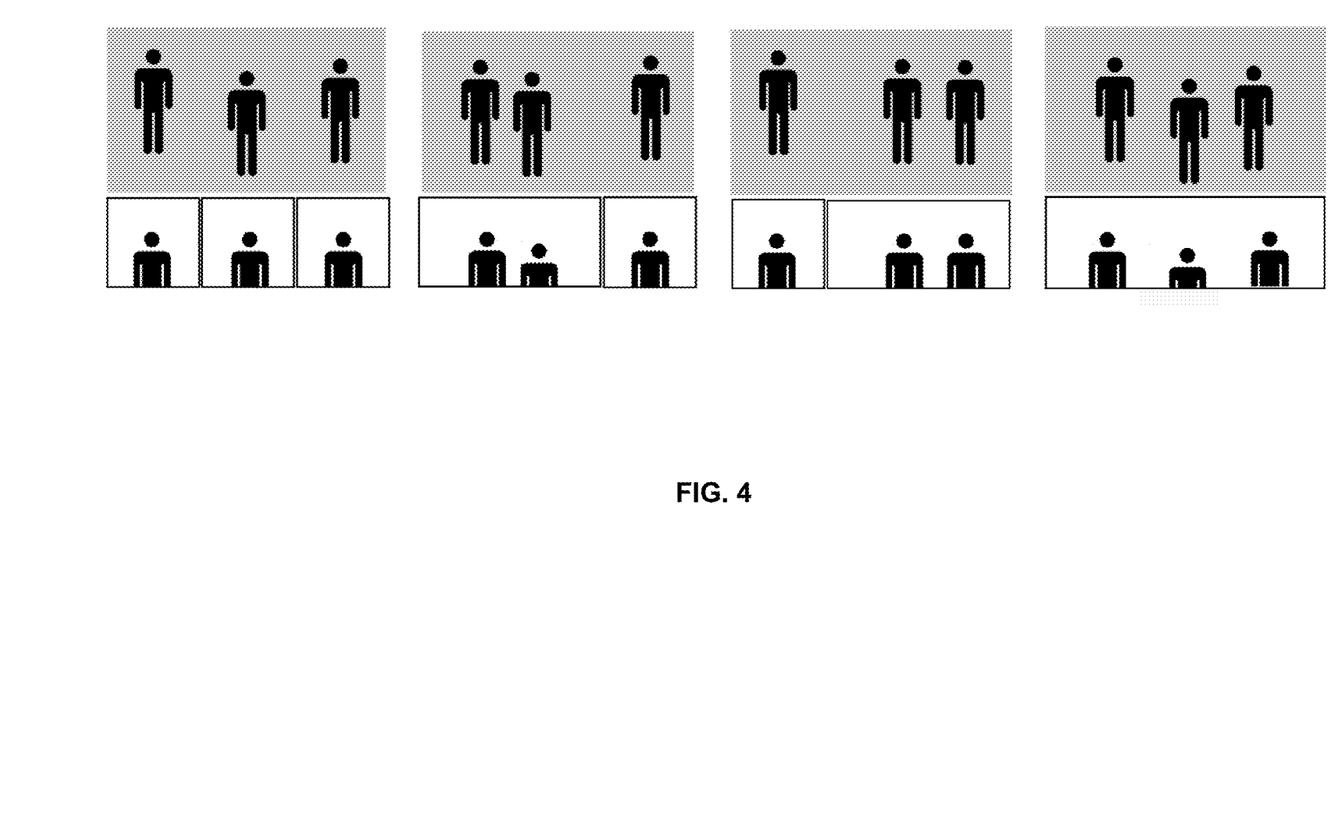
FIG. 4 illustrates an exemplary view of generating one or more partition views in the split screen for three objects that are shown in the video of the dynamic scene according to an embodiment herein.

FIG. 4 illustrates an exemplary view of generating the one or more partition views for three objects according to an embodiment herein. The split screen generation system 106 automatically selects the layout configuration with the one or more partition views in bottom half of the split screen, once the shot specification is selected by the user 102, based on the proximity between the one or more objects in the video. The split screen generation system 106 provides (i) three equal individual partition views in the bottom half to depict the associated individual objects in the selected shot specification, when the proximity between the objects is more than the threshold proximity, (ii) two unequal partition views in the bottom half in which a first partition view depicts a combination of first object and a second object and second partition view depicts a third object, when the proximity between the first object and the second object is less than the threshold proximity and the proximity between the third object and the other objects is more than the threshold proximity, (iii) two unequal partition views in the bottom half in which a first partition view depicts the first object and a second partition view depicts a combination of the second and the third object, when the proximity between the first object and the other objects is more than the threshold proximity and the proximity between the second object and the third object is less than the threshold proximity, and (iv) a single partition view in the bottom half that depicts combination of all three objects in the video, when the proximity between the three objects is less than the threshold proximity. Similarly the split screen generation system 106 is configured to generate any number of partition views for any number of objects based on the proximity in the video.

Figure 5:
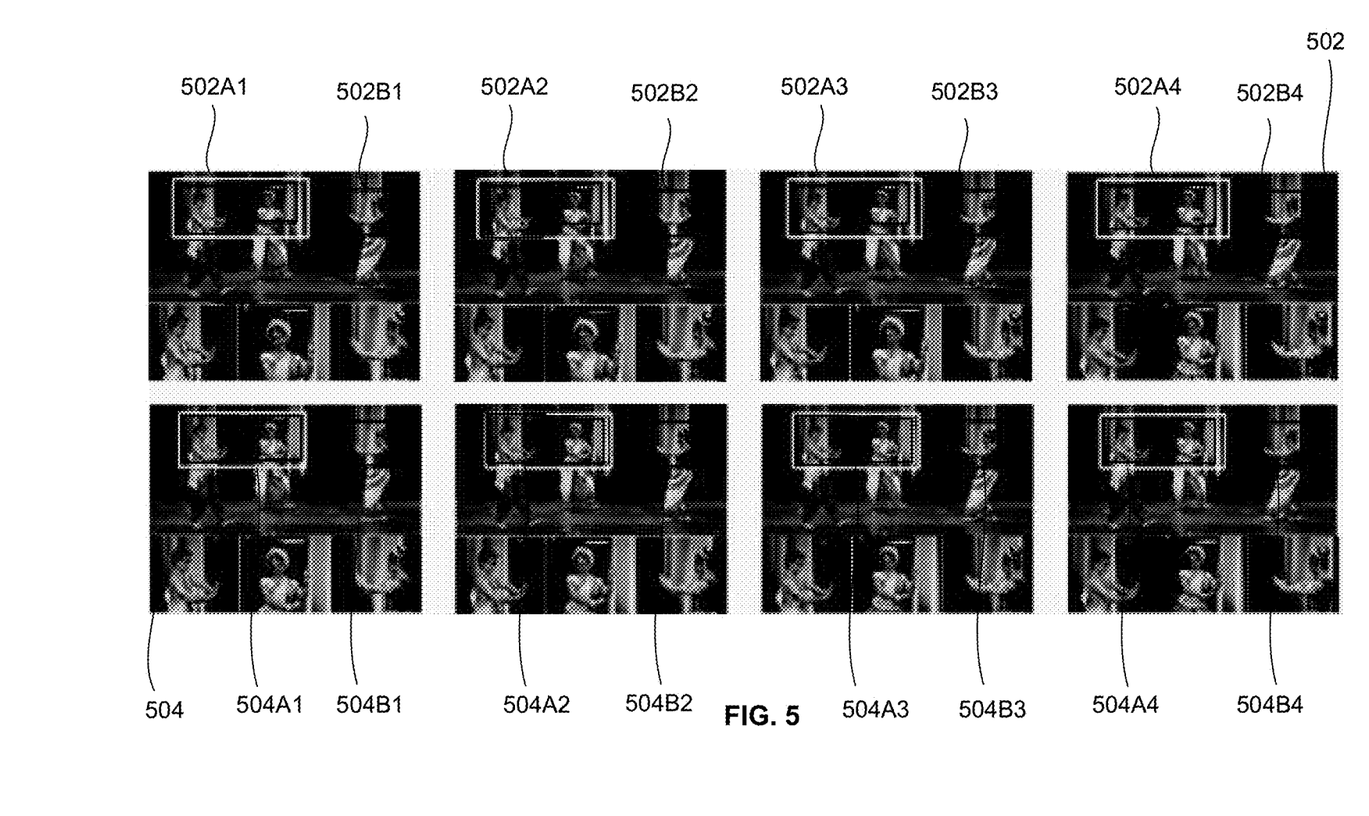
FIG. 5 is an exemplary view that illustrates the split screen of the video of the dynamic scene with top down layout constraints and without top down layout constraints at different time transitions, according to an embodiment herein.

FIG. 5 is an exemplary view that illustrates the split screen generated for the video of the dynamic scene with the top down layout constraints technique and without the top down layout constraints technique at different time transitions (t1-t4), according to an embodiment herein. The split screen without the top down layout constraints technique 502 in the bottom half suffer from jerks at the point of transitions (t) when the one or more objects move from one partition view to another partition view. The split screen without the top down layout constraints technique 502 in which 502A1-A4 are computed higher order shot specification (medium shot specification) of left two objects in the video at different time transitions t1-t4 respectively and 502B1-B4 are computed individual or subset shot specification (medium shot specification) for all three objects in the video at different time transitions t1-t4 respectively. The split screen without the top down layout constraints technique 502 shows that the split screen suffer from jerks due to the higher order shot specification not equal to the union of its subset shot specification. The split screen generation system 106 utilizes the top down layout constraints technique to provide jerk free transitions by configuring the computed higher order shot specification exactly equal to the union of subset shot specification, at any point of transitions (t). The split screen with the top down layout constraints technique 504 in which 504A1-A4 are computed higher order shot specifications of left two objects in the video at different time transitions t1-t4 respectively and 504B1-B4 are computed individual or subset shot specifications for all three objects in the video at different time transitions t1-t4 respectively. The split screen with the top down layout constraints technique 504 shows the split screen with jerk free transitions at the point of transitions (t) by configuring or making the higher order shot specification equal to the union of its subset shot specification. In an embodiment, the split screen generation system 106 uses the top down layout constraints technique to generate the split screen with jerk free transitions not only by concatenating the subset shot specification to the higher order shot specification but also by splitting the higher order shot specification to its subset shot specifications at any point of transitions (t1-t4).

Figure 6:
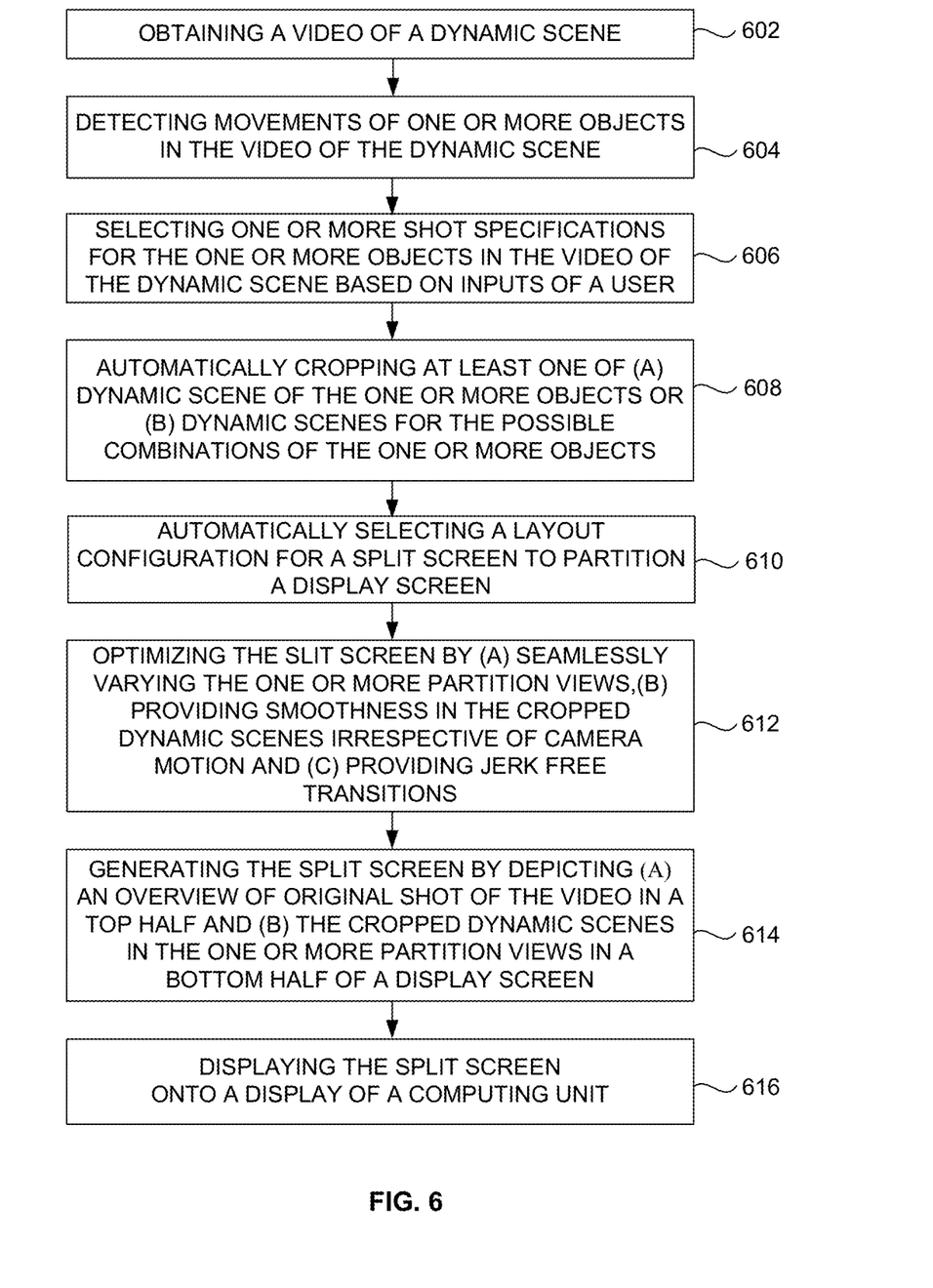
FIG. 6 is a flow diagram illustrating a method for automatically generating split screen for the video of the dynamic scene using the split screen generation system of FIG. 1 according to an embodiment herein.

FIG. 6 is a flow diagram illustrating a method for automatically generating the split screen for the video of the dynamic scene using the split screen generation system 106 of FIG. 1, according to an embodiment herein. At step 602, the video of the dynamic scene is obtained. At step 604, the movements of one or more objects in the video of the dynamic scene are detected. At step 606, the one or more shot specifications are selected for the one or more objects in the video of the dynamic scene to generate the split screen. At step 608, (a) the dynamic scene for the one or more objects or (b) the dynamic scenes for the possible combinations of the one or more objects are cropped automatically based on the selected shot specification. At step 610, a layout configuration is automatically selected to partition the display screen with the top half and the bottom half with the one or more partition views. Each partition views depict the respective cropped dynamic scenes in the selected shot specification. At step 612, the one or more partition views are optimized by (a) seamlessly varying the one or more partitions, (b) providing smoothness in the camera motion and (c) providing the jerk free transitions at the point of transitions (t) when the one or more objects move from the one partition view to the another partition view. At step 614, the split screen is generated by depicting the master shot in the top half and the cropped dynamic scenes in the one or more partition views of the bottom half. At step 616, the split screen is displayed to the user 102 onto the display of the computing unit 104.

In an embodiment, the video of the dynamic scene is obtained from at least one of computing unit 104, external hard disk, social media, live video capturing means etc. In an embodiment, the split screen generation system 106 dynamically adjusts the one or more partition views based on the proximity of the one or more objects present in the video of the dynamic scene. In another embodiment, the shot specification includes at least one of (i) the medium shot specification, (ii) the medium close up shot specification, and (iii) the full shot specification etc.

Figure 7:
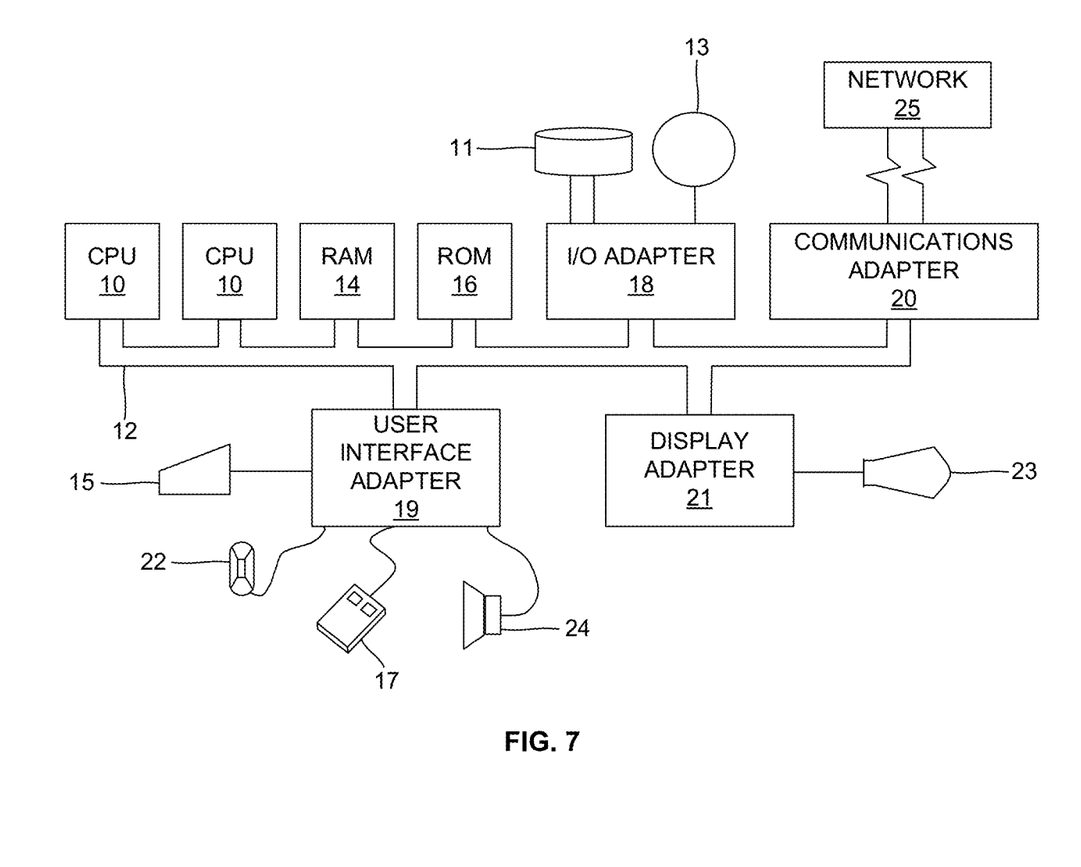
FIG. 7 illustrates a schematic diagram of generic computer architecture used in accordance with the embodiments herein.

A representative hardware environment for practicing the embodiments herein is depicted in FIG. 7. This schematic drawing illustrates a hardware configuration of the computing unit 104 in accordance with the embodiments herein. The system comprises at least one processor or central processing unit (CPU) 10. The CPUs 10 are interconnected via system bus 12 to various devices such as a random access memory (RAM) 14, read-only memory (ROM) 16, and an input/output (I/O) adapter 18. The I/O adapter 18 can connect to peripheral devices, such as disk units 11 and tape drives 13, or other program storage devices that are readable by the system. The system can read the inventive instructions on the program storage devices and follow these instructions to execute the methodology of the embodiments herein.

The system further includes a user interface adapter 19 that connects a keyboard 15, mouse 17, speaker 24, microphone 22, and/or other user interface devices such as a touch screen device (not shown) or a remote control to the bus 12 to gather user input. Additionally, a communication adapter 20 connects the bus 12 to a data processing network 25, and a display adapter 21 connects the bus 12 to a display device 23 which may be embodied as an output device such as a monitor, printer, or transmitter, for example.

The split screen generation system 106 enhances the viewing experience of the user 102 by depicting the emotions of the one or more objects (e.g. lip movements, expressions) in the one or more partition views. The split screen generation system 106 quickly processes the video of the dynamic scene and automatically generates the split screen with desired shot specification in real time. The split screen generation system 106 is further adapted to provide subtitles to the one or more objects in their associated partition views that enhance the viewing experience of the hearing challenged user 102.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the appended claims.

What is claimed is:

1. One or more non-transitory computer readable storage mediums storing one or more sequences of instructions, which when executed by one or more processors, causes automatic generation of split screen for a video of a dynamic scene, by
obtaining the video of the dynamic scene that is captured by a static camera;
detecting one or more objects in the video of the dynamic scene using an object detection technique;
selecting one or more shot specifications for the one or more objects in the video based on inputs of a user;
automatically cropping at least one of (a) the dynamic scene of the one or more objects or (b) the dynamic scene for the possible combinations of the one or more objects in the video based on the selected shot specifications;
automatically selecting a layout configuration for the split screen based on the cropped dynamic scenes of the one or more objects to partition a display screen of a computing unit into (a) a top half and (b) a bottom half with one or more partition views;
automatically optimizing, using a dynamic programming optimization technique, the split screen by (a) seamlessly varying the one or more partition views, (b) providing smoothness in the cropped dynamic scenes irrespective of the camera motion and (c) providing jerk free transitions when the one or more objects move from one partition view to another partition view;
automatically generating the split screen by depicting (a) an overview of the original shot of the video in the top half and (b) the cropped dynamic scenes in the one or more partition views of the bottom half; and
displaying the split screen in real time onto a display of the computing unit.

2. The one or more non-transitory computer readable storage mediums storing one or more sequences of instructions of claim 1, wherein the optimization of the one or partition views is performed based on various factors that comprise at least one of (a) the one or more shot specifications, (b) inclusion of desired objects or (c) a steady camera movement.

3. The one or more non-transitory computer readable storage mediums storing one or more sequences of instructions of claim 1, wherein the video of the dynamic scene is captured by at least one of (a) a single static camera or (b) multiple static cameras positioned at a vantage point covering the entire dynamic scene.

4. The one or more non-transitory computer readable storage mediums storing one or more sequences of instructions of claim 1, wherein the layout configuration is automatically selected based on at least one of (i) a proximity between the one or more objects in the video and (ii) the one or more objects in the video.

5. The one or more non-transitory computer readable storage mediums storing one or more sequences of instructions of claim 1, wherein the one or more shot specifications is selected from a group comprising (a) a medium close up shot specification, (b) a medium shot specification or (c) a full shot specification.

6. The one or more non-transitory computer readable storage mediums storing one or more sequences of instructions of claim 1, wherein the optimization of the split screen is performed using a top down layout constraints technique, wherein the top down layout constraints technique (a) provides the jerk free transitions and (b) seamlessly varies the one or more partition views by at least one of (i) concatenation of one or more subset shot specifications equal to a higher order shot specification or (ii) splitting of the higher order shot specification equal to the one or more subset shot specifications.

7. The one or more non-transitory computer readable storage mediums storing one or more sequences of instructions of claim 1, wherein the selected shot specification provides finer details of (a) emotions, (b) lip movements and (c) body languages of the one or more objects in the video.

8. The one or more non-transitory computer readable storage mediums storing one or more sequences of instructions of claim 1, wherein further analyzes a subtitle in the video and provides the appropriate subtitle for the object in the associated partition view.

9. The one or more non-transitory computer readable storage mediums storing one or more sequences of instructions of claim 6, wherein concatenates the one or more subset shot specifications equal to the higher order shot specification when the proximity between the one or more objects in the video becomes less than a threshold proximity, wherein further automatically splits the higher order shot specification equal to the one or more subset shot specifications when the proximity between the one or more objects in the video becomes more than the threshold proximity.

10. A system for automatically generating split screen for a video of a dynamic scene, comprising:
a memory that stores (a) a set of instructions and (b) a database that stores an original shot of the dynamic scene, dimensions of the split screen of the video of the dynamic scene, a threshold proximity and one or more layout configurations;
characterized in that a specialized split screen generation processor that is configured to
obtain the video of the dynamic scene that is captured by a static camera;
detect one or more objects in the video of the dynamic scene using an object detection technique;
select one or more shot specifications for the one or more objects in the video based on inputs of a user;
automatically crops at least one of (a) the dynamic scene of the one or more objects or (b) the dynamic scenes for the possible combinations of the one or more objects in the video based on the selected shot specifications;
automatically select a layout configuration for the split screen based on the cropped dynamic scenes of the one or more objects to partition a display screen of a computing unit into (a) a top half and (b) a bottom half with one or more partition views;
automatically optimize, using a dynamic programming optimization technique, the split screen by (a) seamlessly varying the one or more partition views, (b) providing smoothness in the cropped dynamic scenes irrespective of the camera motion and (c) providing jerk free transitions when the one or more objects move from one partition view to another partition view;
automatically generate the split screen by depicting (a) an overview of the original shot of the video in the top half and (b) the cropped dynamic scenes in the one or more partition views of the bottom half; and
automatically display the split screen in real time onto a display of the computing unit.

11. The system of claim 10, wherein the optimization of the one or partition views is performed based on various factors that comprise at least one of (a) the one or more shot specifications, (b) inclusion of desired objects or (c) a steady camera movement.

12. The system of claim 10, wherein the video of the dynamic scene is captured by at least one of (a) a single static camera or (b) multiple static cameras positioned at a vantage point covering the entire dynamic scene.

13. The system of claim 10, wherein the layout configuration is automatically selected based on at least one of (i) a proximity between the one or more objects in the video and (ii) the one or more objects in the video.

14. The system of claim 10, wherein the one or more shot specifications is selected from a group comprising (a) a medium close up shot specification, (b) a medium shot specification or (c) a full shot specification.

15. The system of claim 10, wherein the optimization of the split screen is performed using a top down layout constraints technique, wherein the top down layout constraints technique (a) provides the jerk free transitions and (b) seamlessly varies the one or more partition views by at least one of (i) concatenation of one or more subset shot specifications equal to a higher order shot specification or (ii) splitting of the higher order shot specification equal to the one or more subset shot specifications.

16. The system of claim 10, wherein the selected shot specification provides finer details of (a) emotions, (b) lip movements and (c) body languages of the one or more objects in the video.

17. The system of claim 10, wherein the system analyzes a subtitle in the video and provides the appropriate subtitle for the object in the associated partition view.

18. The system of claim 15, wherein the system automatically concatenates the one or more subset shot specifications equal to the higher order shot specification when the proximity between the one or more objects in the video becomes less than the threshold proximity, wherein the system automatically splits the higher order shot specification equal to the one or more subset shot specifications when the proximity between the one or more objects in the video becomes more than the threshold proximity.

19. A computer implemented method for automatically generating split screen for a video of a dynamic scene, comprising:
 obtaining the video of the dynamic scene that is captured by a static camera;
 automatically detecting one or more objects in the video of the dynamic scene using an object detection technique;
 selecting one or more shot specifications for the one or more objects in the video based on inputs of a user;
 automatically cropping at least one of (a) the dynamic scene of the one or more objects or (b) the dynamic scenes of the possible combinations for the one or more objects in the video based on the selected shot specifications;
 automatically selecting a layout configuration for the split screen based on the cropped dynamic scenes to partition a display screen of a computing unit into (a) a top half and (b) a bottom half with one or more partition views;
 automatically optimizing, using a dynamic programming optimization technique, the split screen by (a) seamlessly varying the one or more partition views, (b) providing smoothness in the cropped dynamic scenes irrespective of the camera motion and (c) providing jerk free transitions when the one or more objects move from one partition view to another partition view;
 automatically generating the split screen by depicting (a) an overview of an original shot of the video in the top half and (b) the cropped dynamic scenes in the one or more partition views of the bottom half; and
 displaying the split screen in real time onto a display of the computing unit.

* * * * *

UNITED STATES PATENT AND TRADEMARK OFFICE
CERTIFICATE OF CORRECTION

PATENT NO. : 10,084,970 B2
APPLICATION NO. : 15/832217
DATED : September 25, 2018
INVENTOR(S) : Vineet Gandhi et al.

Page 1 of 1

It is certified that error appears in the above-identified patent and that said Letters Patent is hereby corrected as shown below:

In the Specification

<u>Column 1, Line 5:</u>
Please add the following paragraph after the Title:
--REFERENCE TO GOVERNMENT RIGHTS
This invention was made with government support under IIS1162037 awarded by the National Science Foundation. The government has certain rights in the invention.--.

Signed and Sealed this
Fifth Day of January, 2021

Andrei Iancu
*Director of the United States Patent and Trademark Office*